US012473762B2

(12) United States Patent
Sprague

(10) Patent No.: US 12,473,762 B2
(45) Date of Patent: Nov. 18, 2025

(54) MAGNETIC DOOR LOCK CONTROL SYSTEM AND METHOD

(71) Applicant: Gary Sprague, Visalia, CA (US)

(72) Inventor: Gary Sprague, Visalia, CA (US)

(*) Notice: Subject to any disclaimer, the term of this patent is extended or adjusted under 35 U.S.C. 154(b) by 0 days.

(21) Appl. No.: 17/522,641

(22) Filed: Nov. 9, 2021

(65) Prior Publication Data

US 2023/0147481 A1 May 11, 2023

(51) Int. Cl.
*E05C 19/16* (2006.01)
*E05B 15/00* (2006.01)

(52) U.S. Cl.
CPC .......... *E05C 19/16* (2013.01); *E05B 15/0073* (2013.01)

(58) Field of Classification Search
CPC ...... Y10T 292/11; E05C 19/16; E05C 19/161; E05B 15/0073; E05B 2047/0048; E05B 2047/005; E05B 2047/0053; E05B 2047/0067; E05B 2047/0068; E05B 2047/0069; E05B 47/0038; H01H 36/0073
See application file for complete search history.

(56) References Cited

U.S. PATENT DOCUMENTS 2,520,935 A * 9/1950 Hubbell ............. H01H 36/0073 310/104
2,847,528 A * 8/1958 Combs ...................... H01H 5/02 200/7
2,971,068 A * 2/1961 Wegner .................... H01H 5/02 335/207
3,281,735 A * 10/1966 Blumish ............ H01H 36/0073 335/207
3,373,386 A * 3/1968 Ehrenberg ............... H01H 5/02 200/404
3,539,741 A * 11/1970 Voland ............... H01H 36/0073 335/207
3,676,811 A * 7/1972 Parlato ................... H01H 36/00 335/205
3,706,090 A * 12/1972 Callaghan ............. G08B 13/08 49/13
4,288,767 A * 9/1981 Lee .................... H01H 36/0073 335/207
11,322,323 B1 * 5/2022 Cantolino .......... H01H 36/0073
(Continued)

FOREIGN PATENT DOCUMENTS

AT 525911 B1 * 9/2023 ......... E05B 47/0607
CA 2206286 A1 * 5/1997 ......... G07C 9/00944
(Continued)

OTHER PUBLICATIONS

DE 2909448 A1, Espacenet machine translation, Mar. 10, 1979 (Year: 2023).*

*Primary Examiner* — Kristina R Fulton
*Assistant Examiner* — Steven A Tullia

(57) ABSTRACT

A magnetic door lock control system for use with an egress handle system and a door is provided. The magnetic door lock control system employs magnets that communicate with one another across the door jamb thereby eliminating the need for a hard wired electrical connection between the egress handle system (e.g., a mechanical switch bar) configured with a door and a door locking mechanism mounted above the door in the header of the entranceway. In this way, the need for an electrical wire loop between the egress handles and the door locking mechanism is eliminated.

20 Claims, 9 Drawing Sheets

(56) References Cited

U.S. PATENT DOCUMENTS

| | | | | |
|---|---|---|---|---|
| 2003/0031025 | A1* | 2/2003 | Huizenga | B60Q 1/2669 362/85 |
| 2004/0036565 | A1* | 2/2004 | Farrey | H01H 37/56 335/207 |
| 2006/0175842 | A1* | 8/2006 | Saitoh | E05C 19/163 292/251.5 |
| 2007/0158960 | A1* | 7/2007 | Tanimoto | E05B 81/78 292/336.3 |
| 2007/0252407 | A1* | 11/2007 | Cavallucci | E05B 81/08 296/146.4 |
| 2010/0231334 | A1* | 9/2010 | Carpenter | H01H 36/0073 335/205 |
| 2011/0128102 | A1* | 6/2011 | Pfeiffer | H01H 36/0073 335/206 |
| 2012/0206224 | A1* | 8/2012 | Simmons | H01H 36/0073 335/205 |
| 2012/0212001 | A1* | 8/2012 | Benitez | E05B 17/22 340/5.1 |
| 2016/0215524 | A1* | 7/2016 | Yoshikawa | E05B 47/0002 |
| 2016/0257286 | A1* | 9/2016 | Bianchi | G06K 7/10415 |
| 2020/0194201 | A1* | 6/2020 | Pearce | H01H 36/0073 |
| 2020/0357588 | A1* | 11/2020 | Stallmer | H01H 36/002 |

FOREIGN PATENT DOCUMENTS

| | | | | | |
|---|---|---|---|---|---|
| CN | 86206167 | U | * | 8/1986 | H01H 36/00 |
| CN | 2103199 | U | * | 11/1991 | H01H 36/00 |
| CN | 2168331 | Y | * | 12/1992 | H01H 36/00 |
| CN | 2167440 | Y | * | 6/1993 | H01H 36/00 |
| CN | 2338872 | Y | * | 7/1998 | H01H 36/00 |
| CN | 2533566 | Y | * | 3/2002 | H01H 36/00 |
| CN | 1433497 | A | * | 7/2003 | E05B 47/0002 |
| CN | 2870140 | Y | * | 2/2007 | H01H 36/00 |
| CN | 201259867 | Y | * | 6/2009 | H01H 36/00 |
| CN | 102652203 | A | * | 8/2012 | B66B 13/12 |
| DE | 2825263 | C2 | * | 6/1978 | H01H 36/00 |
| DE | 2909448 | A1 | * | 3/1979 | H01H 36/0073 |
| DE | 3424418 | C1 | * | 7/1984 | H01H 36/0073 |
| DE | 10006747 | A1 | * | 8/2001 | G07C 9/0073 |
| DE | 19920934 | C2 | * | 1/2003 | E05C 19/16 |
| DE | 20220993 | U1 | * | 12/2004 | E05B 47/0012 |
| EP | 2248971 | A1 | * | 11/2010 | E05B 47/0038 |
| EP | 2248971 | B1 | * | 4/2018 | E05B 47/0038 |
| EP | 3680426 | A1 | * | 7/2020 | E05B 47/0038 |
| FR | 2945065 | A1 | * | 11/2010 | E05B 47/0038 |
| GB | 2453514 | A | * | 4/2009 | E05B 81/14 |
| KR | 200382646 | Y1 | * | 1/2005 | G07C 9/00174 |
| KR | 20110052499 | A | * | 11/2010 | E05B 83/36 |
| WO | WO-2022043375 | A1 | * | 3/2022 | E05B 47/0012 |

* cited by examiner

MAGNETIC DOOR LOCK CONTROL SYSTEM AND METHOD

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to locking systems, including magnetic door lock control systems for use with egress handles and doors.

BACKGROUND

Glass doorway systems typically incorporate egress handle systems that enable users to open the doors. In operation, the user simply presses against a mechanical switch bar (i.e., the door push handle) that electrically activates the door to unlock so that the user may open the door and pass through. In some installations of this sort (e.g., with aluminum framed glass doors), the locking mechanism is mounted above the doorway in the header of the entrance such that electrical wires are required to extend from the mechanical switch bar, across the door jamb, and to the locking mechanism.

In other installations (e.g., for heavy glass doors), wires from the mechanical switch bar may be concealed within a round tubing handle routed through the top of a vertical handle tube and into the top door rail, through a wire conduit (door loop) at the hinge side of the door rail, and into the header above where it is connected to an electromagnetic door lock.

In either arrangement, the mechanical switch bar communicates electrically, through electrical wires, with the locking mechanism to activate and deactivate the door lock. The electrical wires are typically encased in shielding and provided as a connectorized wire loop. However, the wire loop cannot be easily hidden from view, and may distract from the clean and simple appearance of the glass entryway. In addition, the wire loop may be prone to corrosion and tampering.

Accordingly, there is a need for a magnetic door lock control system that eliminates the need for the electrical wire loop, and that instead, utilizes magnetic forces as a way for an egress handle system to communicate with a door locking mechanism.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the system according to exemplary embodiments hereof provides a magnetic door lock control system. The magnetic door lock control system employs magnets that communicate with one another across the door jamb thereby eliminating the need for a hard wired electrical connection between an egress handle system (e.g., a mechanical switch bar) configured with a door and a door locking mechanism mounted above the door in the header of the entranceway.

Referring now to FIGS. 1-8, the system 10 according to exemplary embodiments hereof will be described in further detail.

Figure 1:
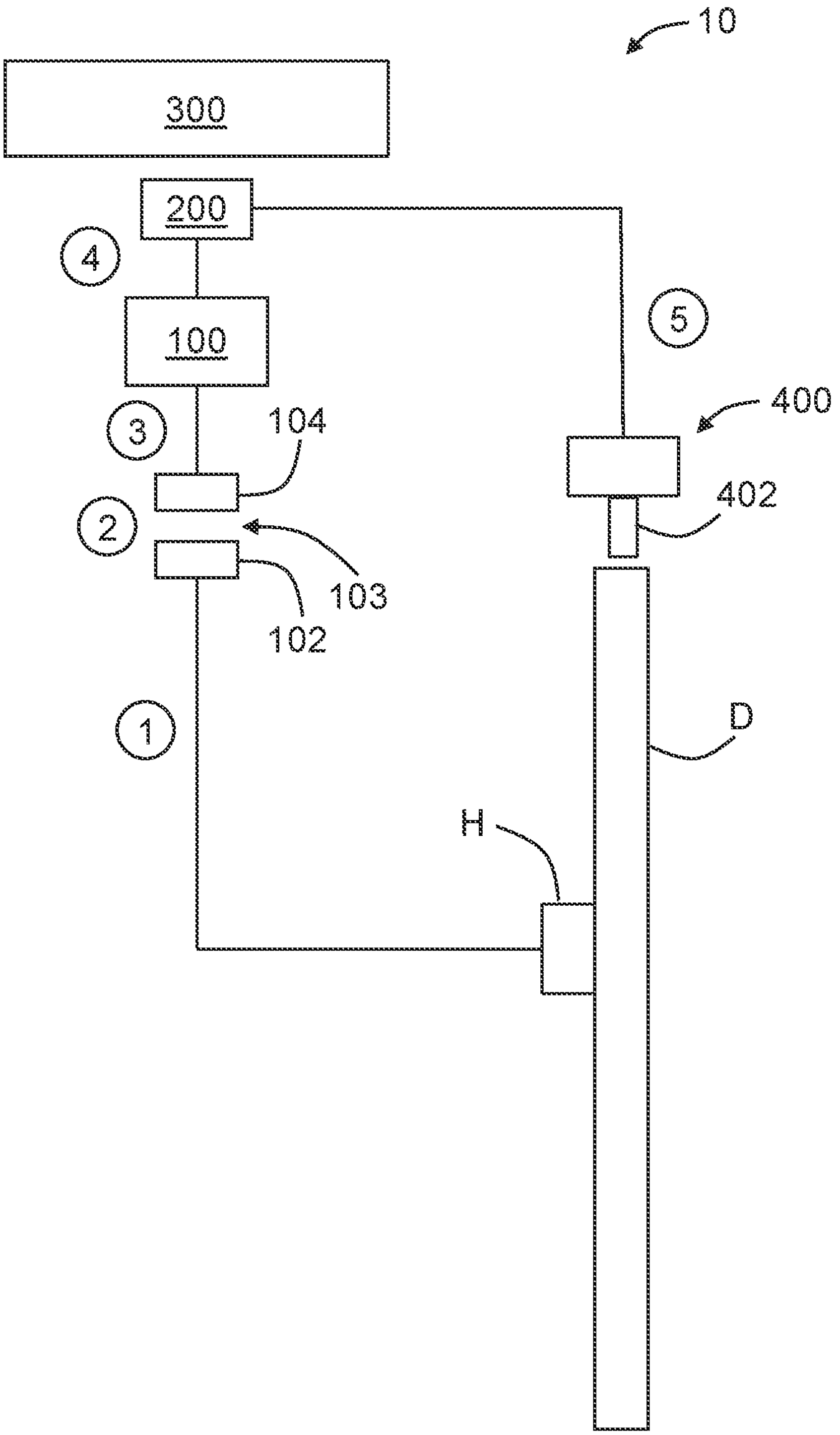
FIG. 1 shows aspects of a magnetic door lock control system according to exemplary embodiments hereof.

In one exemplary embodiment hereof as shown in FIG. 1, the magnetic door lock control system 10 (also referred to herein as simply the system 10), includes an actuator assembly 100, and a switch assembly 200. In some embodiments the system 10 also may include a door stop assembly 300 and/or a lock assembly 400. In general, the actuator assembly 100 interfaces with an egress handle system H configured with a door assembly D (e.g., a glass panel door assembly) such that when a person activates the handles H to open the door D, the actuator assembly 100 triggers the switch assembly 200 which in turn causes the lock assembly 400 to unlock the door D. In some embodiments, the actuator assembly 100 and/or the switch assembly 200 may be configured with the door stop assembly 300 in the header of the doorway.

As will be described herein, in some embodiments the actuator assembly 100 interfaces with the egress handles H magnetically thereby eliminating the need for electrical control wires between the handles H and the actuator assembly 100. Note that the assemblies 100, 200, 300, 400 and the other elements shown in FIG. 1 are represented as simple blocks to demonstrate the general relationship between the assemblies 100, 200, 300, 400 themselves and between the assemblies 100, 200, 300, 400 and the other elements, and that FIG. 1 does not represent the exact sizes, locations, orientations and/or other characteristics of the assemblies 100, 200, 300, 400 and of the other elements. The system 10 also may include additional elements and components as necessary for the system 10 to fulfill its intended functionalities.

Notably, the system 10 utilizes magnets (preferably permanent magnets) and magnetic forces exerted thereby to provide communication between an egress handle system H and the actuator assembly 100 to unlock a door D. In some embodiments as shown in FIG. 1, the actuator assembly 100 includes a first magnet 102 configured with the egress handle system H, and a second magnet 104 in magnetic alignment with the first magnet 102, the first and second magnets 102, 104 separated by a gap 103, such that magnetic forces between the first and second magnets 102, 104 may communicate with one another to affect physical movement between the magnets 102, 104. In some embodiments, it is preferable that the first and second magnets 102, 104 are permanent magnets (e.g., as opposed to electromagnetic magnets).

As shown in FIG. 1, the interface (1) between the egress handle system H and the first magnet 102 is preferably mechanical and/or electrical such that activation of the egress handle H causes a physical movement of the first magnet 102 (e.g., up and/or down). The interface (2) between the first and second magnets 102, 104 is purely magnetic such that physical movement of the first magnet 102 causes a corresponding physical movement of the second magnet 104. The interface (3) between the second magnet 104 and the actuator assembly 100 is mechanical such that movement of the second magnet 104 causes an associated mechanical movement within the actuator assembly 100. The interface (4) between the actuator assembly 100 and the switch assembly 200 is mechanical such that a mechanical movement within the actuator assembly 100 (caused by the movement of the second magnet 104) causes a mechanical actuation of the switch assembly 200 (e.g., a pressing of a plunger-type actuator on the switch 200). The interface (5) between the switch assembly 200 and the lock assembly 400 is electrical with the switch assembly 200 sending electrical control signals to the lock assembly 400 when triggered to unlock the door D.

Figures 2A, 2B:
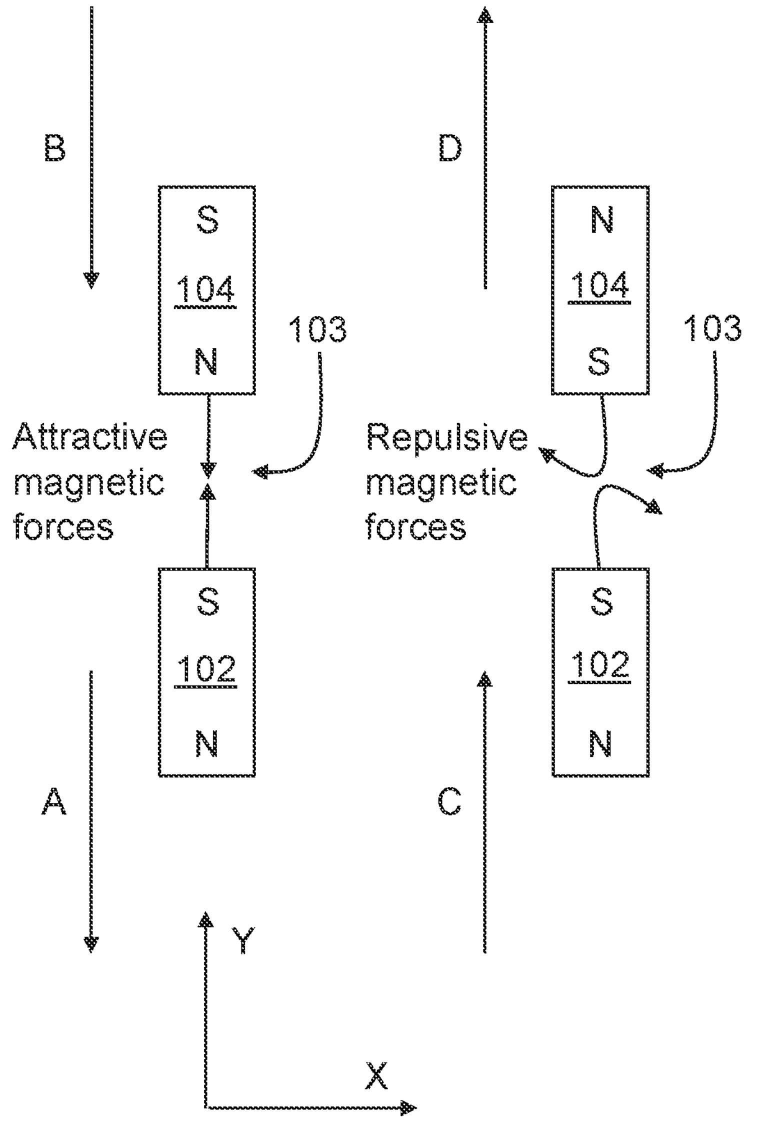
FIGS. 2A-2B show aspects of a first and second magnet according to exemplary embodiments hereof.

FIGS. 2A-2B provide information regarding the arrangement of the first magnet's 102's poles with respect to the second magnet's 104's poles. As shown in FIG. 2A, with the first and second magnets 102, 104 configured to attract one another, e.g., with opposing poles facing one another (e.g., N-S or S-N) across a gap 103, a downward movement of the first magnet 102 in the direction of arrow A will cause a corresponding downward movement of the second magnet 104 in the direction of arrow B. In another example as shown in FIG. 2B, with the first and second magnets 102, 104 configured to repel one another, e.g., with same poles facing one another (e.g., N-N or S-S), an upward movement of the first magnet 102 in the direction of arrow C will cause a corresponding upward movement of the second magnet 104 in the direction of arrow D.

It is understood by a person of ordinary skill in the art that the size and magnetic strength of the first and second magnets 102, 104 are chosen to provide adequate attractive and/or repulsive forces between the magnets 102, 104 in order to provide the functionalities as described herein. It also is understood that the alignment of the magnets 102, 104, and the spacing between the magnets 102, 104 (i.e., the gap 103 between the magnets 102, 104) is chosen to provide the same. For example, in some embodiments, the first and second magnets 102, 104 are aligned along a common vertical axis (e.g., along the Y-axis as shown in FIGS. 2A-2B), but other alignments also may be used.

Figure 3:
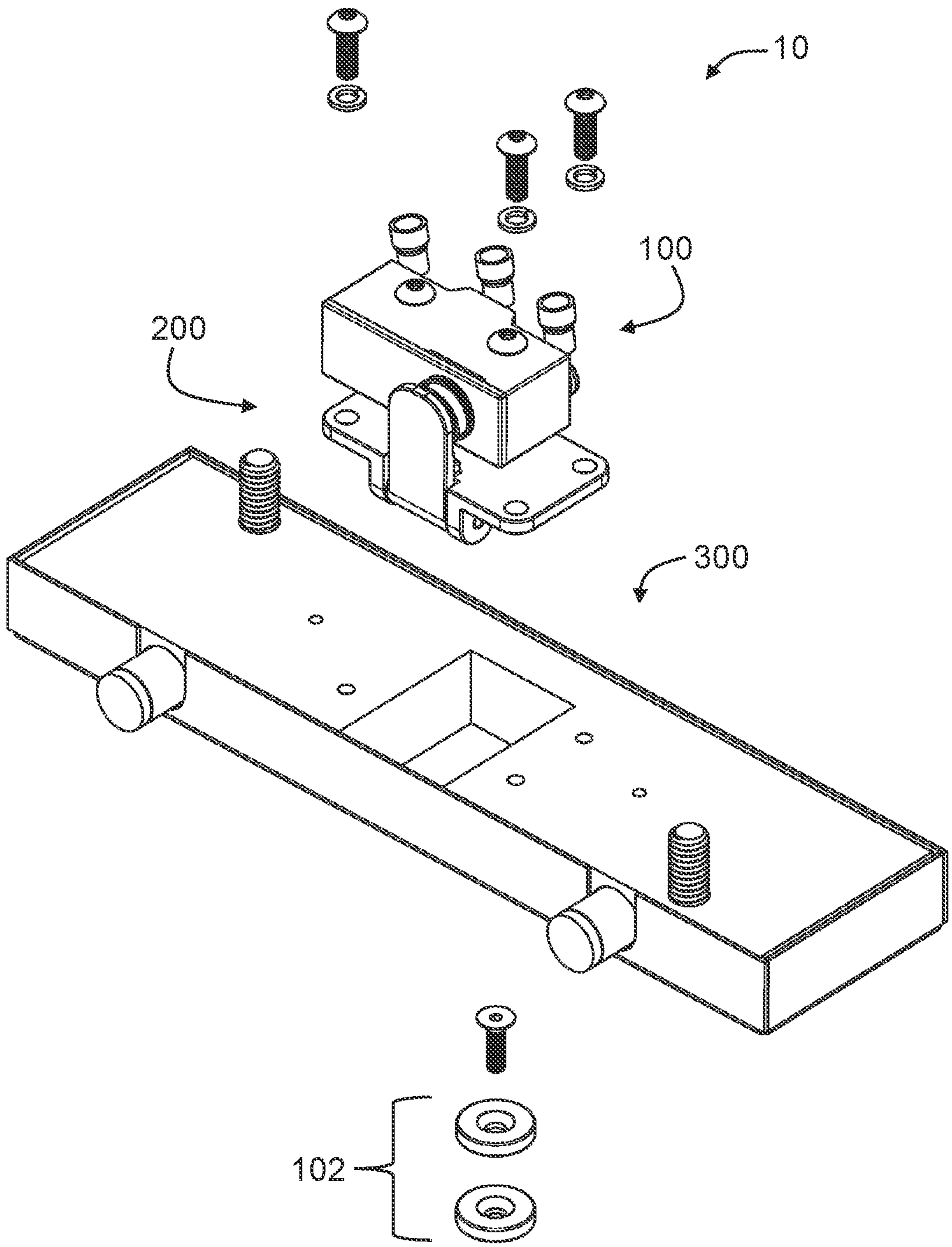
FIG. 3 shows an exploded view of a magnetic door lock control system according to exemplary embodiments hereof.
Figure 4:
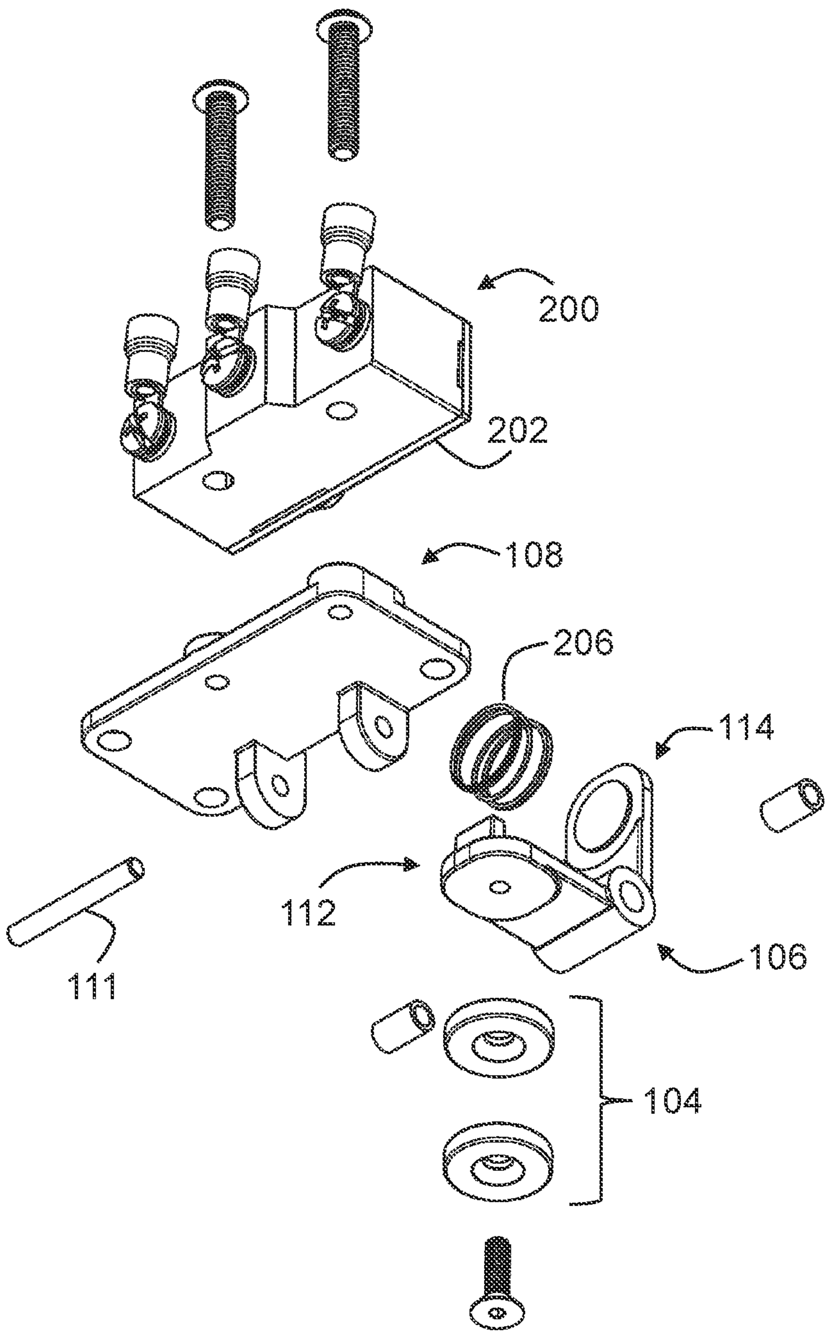
FIG. 4 shows an exploded view of an actuator assembly and a switch assembly according to exemplary embodiments hereof.

FIG. 3 shows an exploded view of the system 10 including the actuator assembly 100, the switch assembly 200, and the door stop assembly 300, and FIG. 4 shows an exploded view of the actuator assembly 100 and the switch assembly 200.

Figure 5:
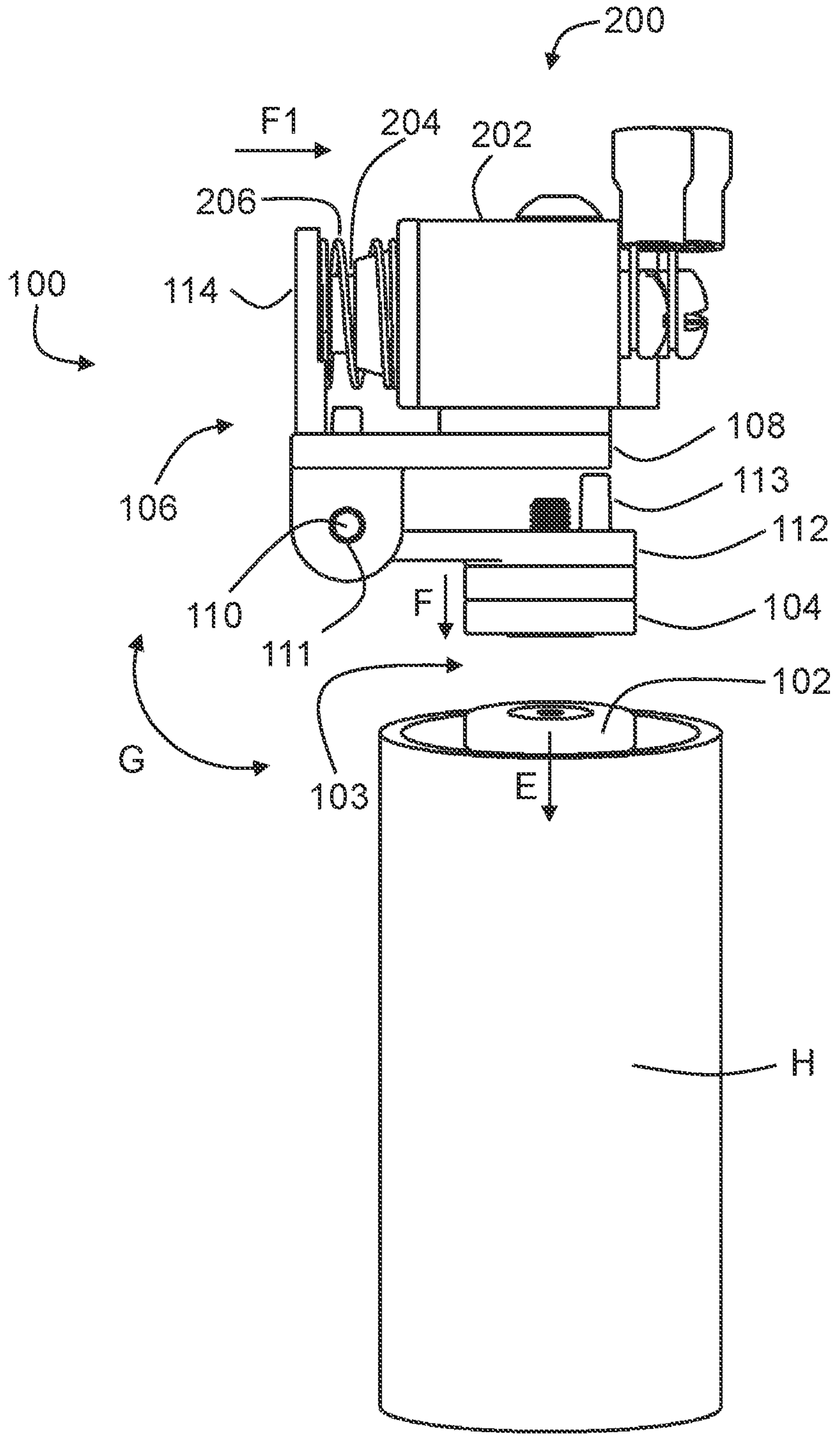
FIG. 5 shows aspects of an actuator assembly according to exemplary embodiments hereof.

FIG. 5 shows a side view of the actuator assembly 100 configured with the switch assembly 200. As shown, and according to some embodiments hereof, the actuator assembly 100 includes a first magnet 102 aligned with a second magnet 104, with the first and second magnets 102, 104 separated by a gap 103. The first magnet 102 is configured with an egress door handle H (represented as a sheath and internal linkage configured with the first magnet 102) such that when the handle H is activated (e.g., a mechanical switch bar is pressed forward), the first magnet 102 is caused to move downward. In this embodiment, the first and second magnets 102, 104 are in attractive alignment (also see FIG. 2A) such that downward movement of the first magnet 102 causes a corresponding downward movement of the second magnet 104.

The actuator assembly 100 includes an actuator arm 106 coupled to the second magnet 104 and rotatably configured with an actuator base 108 about a pivot point 110 (via a pivot pin 111). The actuator arm 106 includes a first portion 112 extending away from a first side of the pivot point 110 and a second portion 114 extending away from a second side of the pivot point 110. In some embodiments, the first and second portions 112, 114 of the actuator arm 106 are generally orthogonal with respect to one another (forming a "L" shaped arm 106 as shown in FIG. 5), but it is understood that other orientations between the first and second portions 112, 114 (such as in-line or offset at other angles) also are contemplated. In some embodiments, the second magnet 104 is coupled to the first portion 112 of the arm 106 (e.g., to the underside of the first portion's 112's distal end) and the second portion 114 of the arm 106 is configured to trigger the switch 200.

In some embodiments as shown by arrows E, F and G of FIG. 5, downward movement of the first magnet 102 in the direction of arrow E causes a corresponding downward movement of the second magnet 104 in the direction of arrow F which in turn causes a clockwise rotational movement of the actuator arm 106 about the pivot point 110 in the direction of arrow G. In this arrangement, a clockwise rotational movement of the arm 106 includes a clockwise rotational movement of both the first and second portions 112, 114 of the arm 106. The clockwise rotational movement of the second portion 114 exerts a force F1 to the switch's plunger-type actuator 204 thereby triggering the switch 202 to electronically activate the lock assembly 400 to unlock the door D.

In some embodiments, the first portion 112 of the actuator arm 106 includes a stop 113 extending between the first portion 112 and a surface of the actuator base 108 (e.g., the lower surface of the base 108 directly above the actuator arm's 106's first portion 112). The stop 113 may be designed to limit the upward movement of the first portion 112 to avoid misalignment and/or damage to the assembly 100.

The switch 200 may include a direct current switch 202 including a plunger-type actuator 204 that when pressed inwards activates the switch 202. It is understood however, that any type of suitable switch may be used as is known in the art. Accordingly, the actuator assembly 100 in this embodiment is configured to convert the downward movement of the first and second magnets 102, 104 into an activation force applied to the switch 200.

In some embodiments, it may be preferable that the switch 202 include a built-in magnetic blowout feature that protects the electrical contacts within the switch from arc erosion.

In some embodiments, the switch 202 includes an actuator spring 206 concentrically configured with the plunger-type actuator 204 to provide an outward bias to the actuator arm's 106's second portion 114. In this way, the arm's 106's second portion 114, when at rest, is held away from the switch's 202's plunger-type actuator 206 to avoid inadvertent triggering of the switch 202. It is preferable that the level of outward bias exerted by the spring 206 onto the second portion 114 be less than the inward force F1 provided by the second portion 114 when caused to move by the movement of the second magnet 104. In this way, the second portion 114 may adequately press the plunger 206 inward to trigger the switch 202 when in use.

It can be seen then that one inventive concept of the system 10 is that the actuator assembly 100 establishes a magnetic force between the first and second magnets 102, 104 across a gap 103, enables the first magnet 102 to be moved (e.g., through its configuration with the egress handles H) and utilizes the magnetic force between the magnets 102, 104 to cause movement of the second magnet 104 without physical or electrical connections. The actuation assembly 200 also redirects the movement of the second magnet 104 into a force that actuates the switch assembly 200 that in turn triggers the lock assembly 400 to unlock the door D.

FIGS. 6A-6D illustrate various types of actuator arms 106 (with first and second portions 112, 114 coupled about a pivot point 110) in various configurations to demonstrate the flexibility of the system's 10's architecture.

Figure 6A:
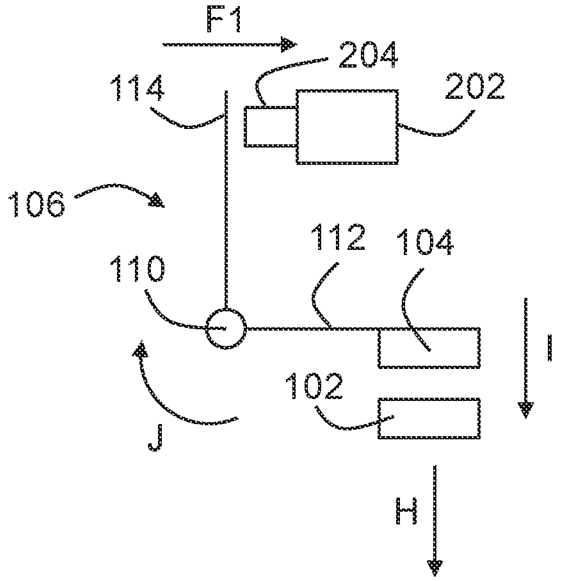
FIGS. 6A-6D show aspects of various configurations of an actuator assembly and a switch assembly according to exemplary embodiments hereof.

FIG. 6A shows the "L" shaped actuator arm 106 and switch 202 configuration described above in relation to FIG. 5. In this embodiment, the poles of the first and second magnets 102, 104 are aligned to attract one another (see FIG. 2A) such that a downward movement of the first magnet 102 in the direction of arrow H causes a downward movement of the second magnet 104 in the direction of arrow I that causes a clockwise rotation of the actuator arm 106 in the direction of arrow J that causes a left-to-right force F1 exerted by the arm's 106's second portion 114 onto the plunger-type actuator 206 of the switch 202.

Figure 6B:
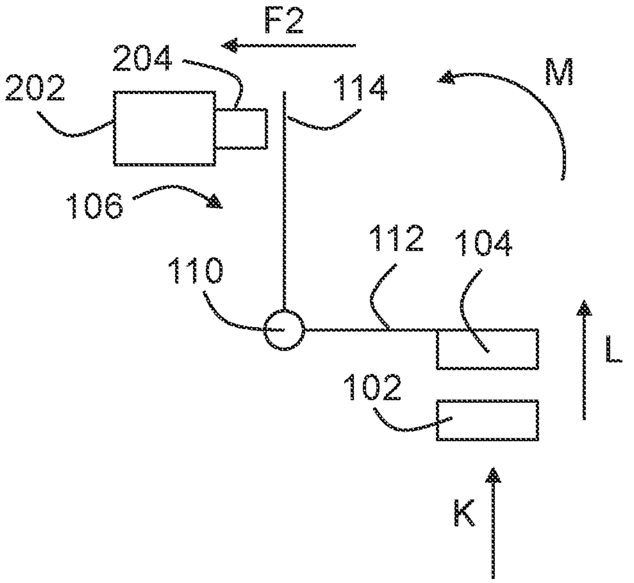

FIG. 6B shows an "L" shaped actuator arm 106 with the switch 202 configured on the opposite side of the arm's 106's second portion 114. In this embodiment, the poles of the first and second magnets 102, 104 are aligned to repel one another (see FIG. 2B) such that an upward movement of the first magnet 102 in the direction of arrow K causes an upward movement of the second magnet 104 in the direction of arrow J that causes a counterclockwise rotation of the actuator arm 106 in the direction of the arrow M that causes a right-to-left force F1 exerted by the arm's 106's second portion 114 onto the plunger-type actuator 206 of the switch 202.

Figure 6C:
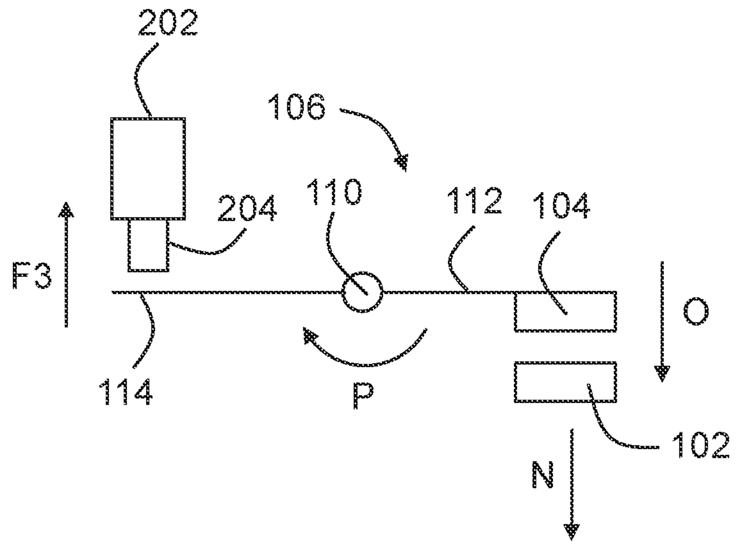

FIG. 6C shows a straight actuator arm 106 with the arm's 106's first and second portions 112, 114 in-line with one another about the pivot point 110 and with the switch 202 configured above the arm's 106's second portion 114. In this embodiment, the poles of the first and second magnets 102, 104 are aligned to attract one another (see FIG. 2A) such that a downward movement of the first magnet 102 in the direction of the arrow N causes a downward movement of the second magnet 104 in the direction of the arrow O that causes a clockwise rotation of the actuator arm 106 in the direction of the arrow P that causes an upward force F3 exerted by the arm's 106's second portion 114 onto the plunger-type actuator 206 of the switch 202.

Figure 6D:
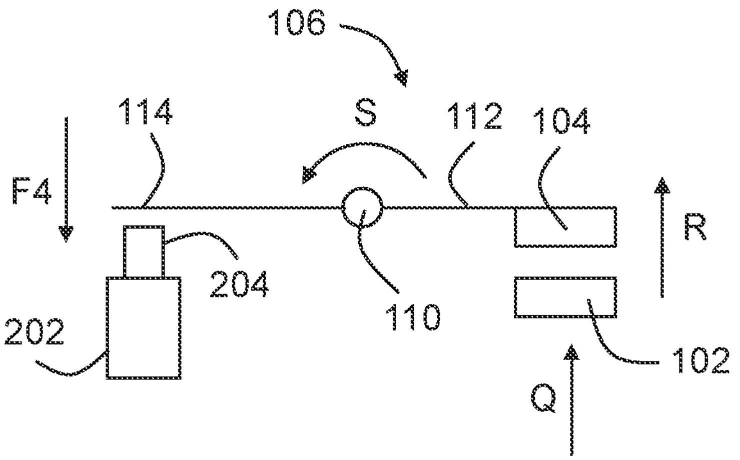

FIG. 6D shows a straight actuator arm 106 with the arm's 106's first and second portions 112, 114 in-line with one another about the pivot point 110 and with the switch configured below the arm's 106's second portion 114. In this embodiment, the poles of the first and second magnets 102, 104 are aligned to repel one another (see FIG. 2B) such that an upward movement of the first magnet 102 in the direction of the arrow Q causes an upward movement of the second magnet 104 in the direction of arrow R that causes a counterclockwise rotation of the actuator arm 106 in the direction of the arrow S that causes a downward force F4 exerted by the arm's 106's second portion 114 onto the plunger-type actuator of the switch 202.

It will be understood by a person of ordinary skill in the art that the arrangements shown in FIGS. 6A-6D are meant for demonstration and that the system 10 may implement any variations of these arrangements as necessary. For example, the first and second portions 112, 114 of the actuator arm 106 may be oriented at any offset angles between the orthogonal and in-line arrangements shown, and any combinations and/or variations thereof. The switch 202 also may be located and oriented accordingly in any way to receive a force from the second portion 114 of the actuator arm 106 as required to trigger the switch 202 and to unlock the door D.

The architecture and structure of the actuator assembly 100 and its configuration with the overall system 10 may be designed in different ways to support the various elements and assemblies 100, 200, 300, 400 in relation to one another and in relation to the egress handles H and the door D such that the system 10 is able to perform its various functionalities as described herein.

Figure 7:
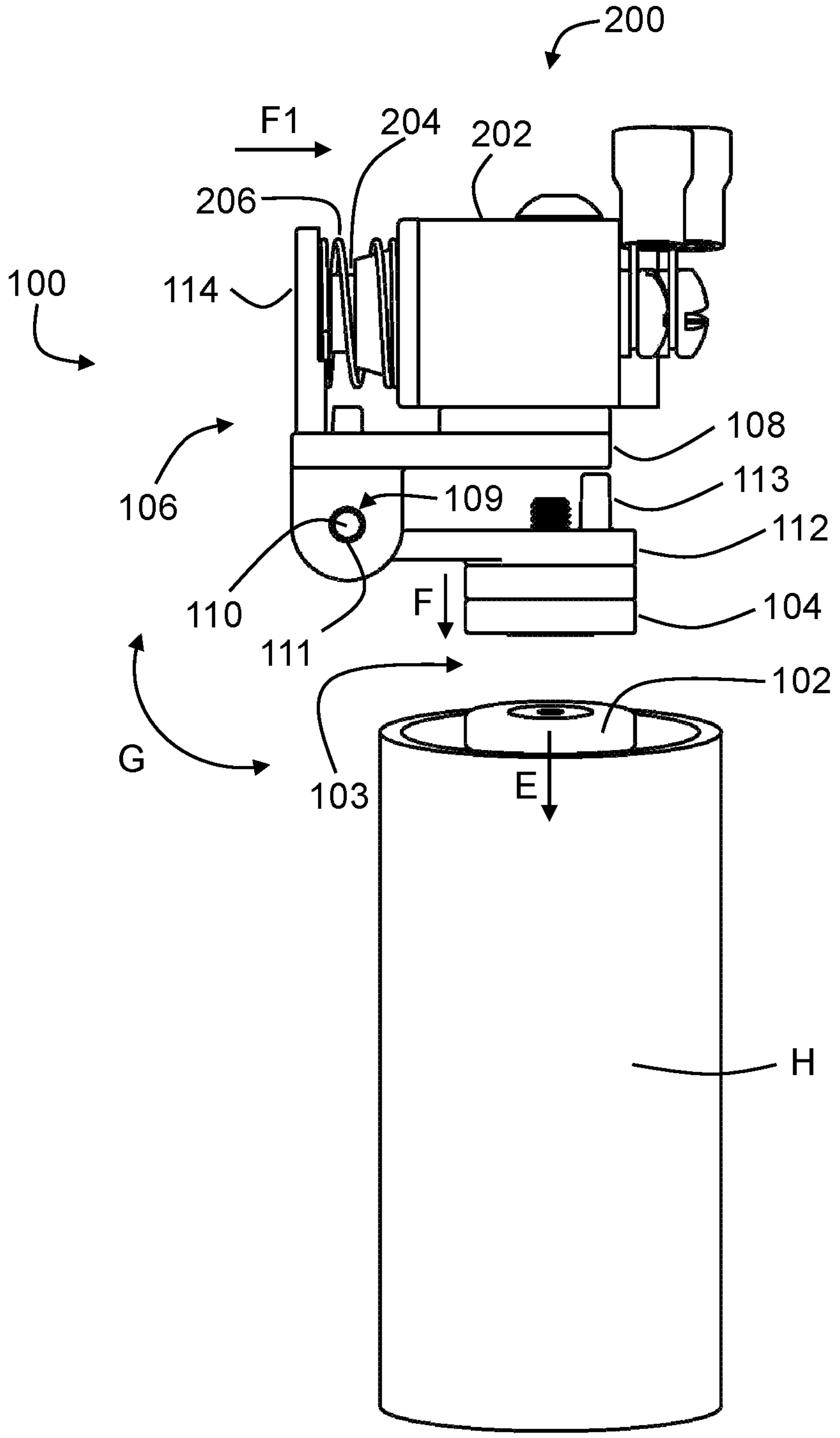
FIG. 7 shows aspects of an actuator assembly according to exemplary embodiments hereof.

For example, in one embodiment as shown in FIG. 7, the switch 202 is mounted to an upper surface of the actuator base 108 generally above and to the right of the pivot point 110. The pivot point 110 is established between the actuator base 108 and the actuator arm 106 by a pivot pin 111 passing through aligned openings 109 through the base 108 and the arm 106. Then, in some embodiments, with the base 108 mounted to a surface of the door stop assembly 300 (as described in other sections) the actuator arm 106 is free to move relative to the base 108 and door stop assembly 300 combination.

Figure 8:
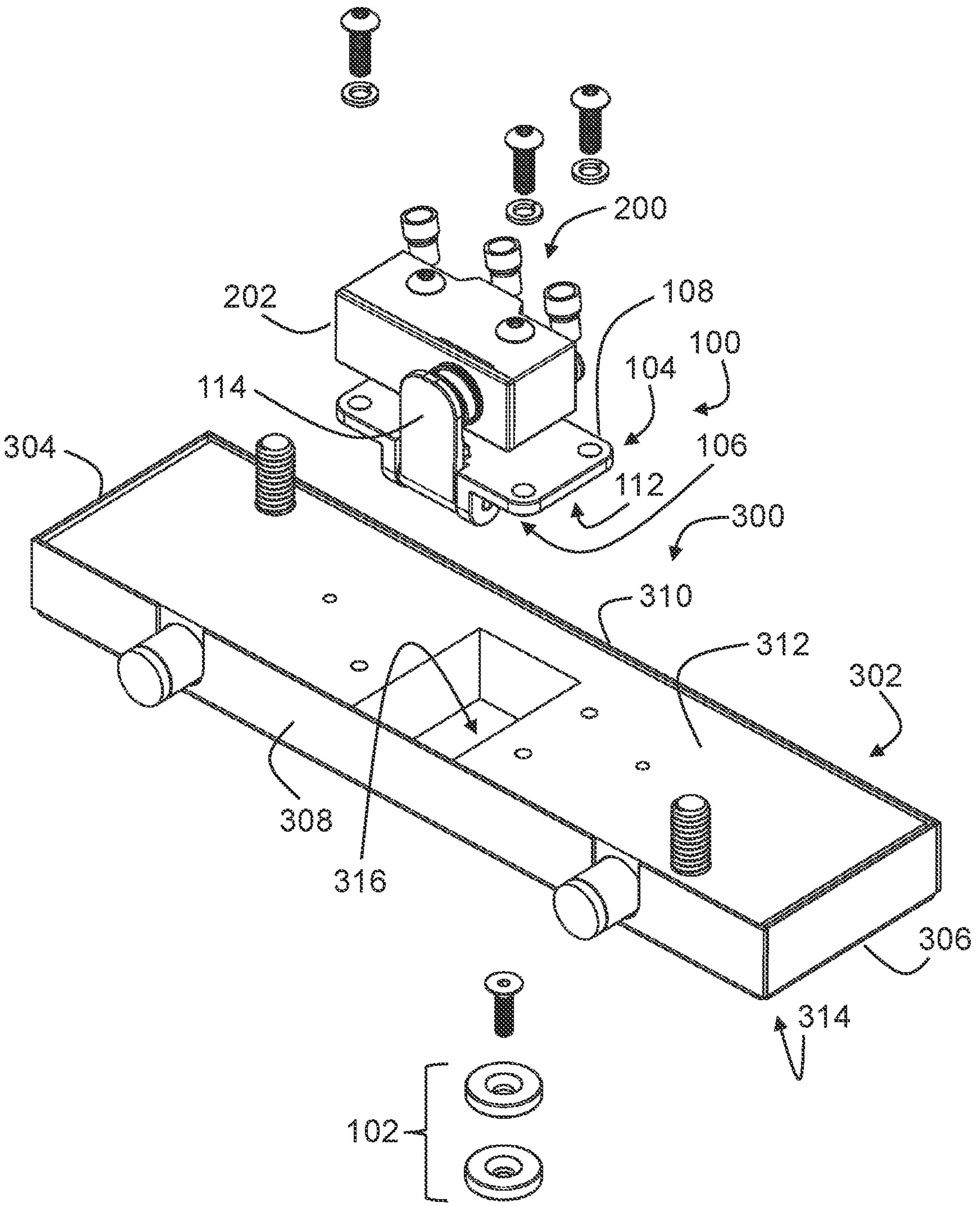
FIG. 8 show aspects of a magnetic door lock control system according to exemplary embodiments hereof.

In some embodiments as shown in FIG. 8, the actuator assembly 100 and the switch assembly 200 may be coupled to the door stop assembly 300. In this way, the combination of assemblies 100, 200, 300 may be mounted together (e.g., in the header of the doorway) and configured with an egress door system H and a door D within an entranceway.

In some embodiments, the door stop assembly 300 includes a housing 302. The housing 302 includes a left side 304, a right side 306, a front side 308, a back side 310, a top side 312, and a bottom side 314. In some embodiments, the housing 302 includes a cavity 316 adapted to receive at least a portion of the actuator assembly 100 and/or the switch assembly 200. In some embodiments, the cavity 316 is located in the top side 314 towards the front side 310. However, it is understood that the cavity 304 may be located in any side and/or location on the housing 302 as required by the system 10.

In some embodiments, the actuator base 108 is coupled to the top side 314 of the housing 302. For example, the base 108 may include bolt holes in each of its corners that align with corresponding bolt holes in the housing's 302's top side 312 on either sides of the cavity 316 such that bolts may pass through the base 108 and into the housing 302 to secure the base 108 thereto. In this arrangement, the actuator arm 106 may be positioned generally above (and/or partially within) the cavity 316 so that the arm 106 may rotate into the cavity 316 when movement of the first magnet 102 causes movement of the second magnet 104. In particular, the first portion 112 of the actuator arm 106 and the second magnet 104 may move within the cavity 316 when the first magnet 102 causes the second magnet 104 to move.

In some embodiments the lock assembly 400 may include one or more electromagnetic locks 402 (see FIG. 1) configured to lock and/or unlock the door D. As is known in the art, the lock assembly 400 may be configured in any location and orientation required to perform these functionalities. For example, the lock assembly 400 may be configured with a door jamb, a door rail, and/or with any other component and/or system associated with the door D in order to lock and unlock the door D.

Given the above, in some embodiments, it may be preferable that the switch assembly 200 include high current handling capacity to enable direct operation of the lock(s) 402 (e.g., a 10 amp@125 VDC (resistive) SPDT switch rated at 1,000,000 mechanical operations).

It is understood that while the lock assembly 400 may include internal switches that utilize magnets and/or magnetic fields, these magnets may typically include electromagnetic magnets as opposed to permanent magnets. It also is understood that the magnets 102, 104 are separate and distinct from any magnets that may be included in the lock assembly 400.

It is understood that electrical wires or other types of connections may be implemented between the output terminals on the switch assembly 200 and the lock assembly 400. In some embodiments, the switch 202 may include three electrical terminals to permit normally open and/or normally closed operations, and with two terminals required to interface between the switch 202 and the lock assembly 400.

It is understood that any aspects and/or elements of any embodiments of the system 10 described herein or otherwise may be combined in any way to form additional embodiments of the system 10 all of which are within the scope of the system 10.

Benefits of the System

The benefits of the system 10 are multifold and include, without limitation:

First, the system 10 eliminates the need for electrical current in the egress door handle.

Second, the system 10 eliminates the need for a wire loop across the door jamb to electrically communicate between the egress handles and the door stop assembly 300. Instead, this is implemented using magnetic forces between the first and second magnets 102, 104 as described herein.

Third, because of the elimination of the wire loop, the overall doorway entrance includes a much cleaner appearance.

Fourth, because of the elimination of the wire loop, the system 10 is tamper proof.

Fifth, the system 10 easily interfaces with complex security systems.

It is understood that the benefits shown above are meant for demonstration and that other benefits of the system 10 may also exist. Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for unlocking a door, the door including a handle assembly, the system comprising:

a first actuator arm including a first arm first end and a first arm second end, and a second actuator arm including a second arm first end and a second arm second end, the first arm first end coupled to a first side of a pivot mechanism and the second arm first end coupled to a second side of the pivot mechanism;

a first magnet aligned with a second magnet, the first and second magnets separated by a first gap, the first magnet configured with the handle assembly and the second magnet coupled to the second arm second end; and a switch configured with the first arm second end;

wherein a first movement of the handle assembly causes a second movement of the first magnet in a first direction, and the second movement of the first magnet causes a third movement of the second magnet in substantially the first direction and at least partially into the first gap;

wherein the third movement is caused solely by a first magnetic force across the first gap provided at least in part by the first magnet;

wherein the third movement triggers the switch.

2. The system of claim 1 wherein the first magnetic force is established by the first magnet and/or by the second magnet.

3. The system of claim 1 wherein the third movement of the second magnet causes a fourth movement of the first actuator arm.

4. The system of claim 3 wherein the fourth movement of the first actuator arm triggers the switch.

5. The system of claim 1 wherein the first actuator arm and the second actuator arm are coupled to the pivot mechanism in an orthogonal arrangement with respect to one another.

6. The system of claim 1 wherein the third movement is caused solely by an attractive magnetic force between the first and second magnets.

7. The system of claim 1 wherein the switch is configured with a lock for locking and unlocking the door, and the third movement triggers the switch to activate the lock to unlock the door.

8. The system of claim 1 wherein the first magnet and the second magnet are permanent magnets.

9. The system of claim 1 wherein the first direction is away from the second magnet, and the third movement of the second magnet is towards the first magnet.

10. The system of claim 1 wherein the third movement is caused solely by an attractive magnetic force between the first and second magnets.

11. The system of claim 1 wherein the second movement of the first magnet and the third movement of the second magnet are each along a shared axis.

12. A system for unlocking a door, the door including a handle assembly, the system comprising:

a first magnet aligned with a second magnet, the first and second magnets separated by a first gap, the first magnet configured with the handle assembly and the second magnet coupled to an actuator arm, the actuator arm including a first arm portion and a second arm portion, the first and second arm portions each rotatable about a common pivot point; and a switch configured with the actuator arm;

wherein the second magnet is coupled to the first arm portion and the second arm portion is configured with the switch;

wherein a first movement of the handle assembly causes a second movement of the first magnet in a first direction, the second movement of the first magnet causes a third movement of the second magnet in substantially the first direction, and the third movement of the second magnet causes a fourth movement of the second arm portion that is substantially orthogonal to the third movement;

wherein the third movement is caused solely by an attractive magnetic force across the first gap between the first and second magnets;

wherein the fourth movement triggers the switch.

13. The system of claim 12 wherein the actuator arm includes a first actuator arm portion including a first arm first end and a first arm second end, and a second actuator arm portion including a second arm first end and a second arm second end, the first arm first end coupled to a first side of a pivot mechanism, the second arm first end coupled to a second side of the pivot mechanism, the second magnet coupled to the second arm second end, and the first arm first end configured with the switch.

14. The system of claim 12 wherein the first movement of the handle assembly causes a second movement of the first magnet away from the second magnet, and the second movement of the first magnet causes a third movement of the second magnet towards the first magnet.

15. The system of claim 12 wherein the first actuator arm and the second actuator arm are coupled to the pivot mechanism in an orthogonal arrangement with respect to one another.

16. A system for unlocking a door, the door including a handle assembly, the system comprising:

a first magnet aligned with a second magnet, the first and second magnets separated by a first gap, the first magnet configured with the handle assembly and the second magnet coupled to an actuator arm; and a switch configured with the actuator arm;

wherein a first movement of the handle assembly causes a second movement of the first magnet away from the second magnet, and the second movement of the first magnet causes a third movement of the second magnet towards the first magnet;

wherein the third movement is caused solely by an attractive first magnetic force across the first gap between the first and second magnets;

wherein the third movement triggers the switch.

17. The system of claim 16 wherein the switch is configured with a lock for locking and unlocking the door, and the third movement triggers the switch to activate the lock to unlock the door.

18. The system of claim 16 wherein the actuator arm includes a first actuator arm portion including a first arm first end and a first arm second end, and a second actuator arm portion including a second arm first end and a second arm second end, the first arm first end coupled to a first side of a pivot mechanism, the second arm first end coupled to a second side of the pivot mechanism, the second magnet coupled to the second arm second end, and the first arm first end configured with the switch.

19. The system of claim 16 wherein the second movement moves the entire first magnet away from the second magnet.

20. The system of claim 16 wherein the third movement moves the entire second magnet towards the first magnet.

* * * * *